United States Patent

Hansen et al.

[11] Patent Number: 5,508,496
[45] Date of Patent: Apr. 16, 1996

[54] SELVAGED SUSCEPTOR FOR THERMOPLASTIC WELDING BY INDUCTION HEATING

[75] Inventors: Karl A. Hansen, Seattle; Edward C. Weisberg, Renton, both of Wash.

[73] Assignee: The Boeing Company, Seattle, Wash.

[21] Appl. No.: 314,027

[22] Filed: Sep. 28, 1994

Related U.S. Application Data

[63] Continuation-in-part of Ser. No. 286,360, Sep. 5, 1994, which is a continuation-in-part of Ser. No. 68,520, May 27, 1993, abandoned, which is a continuation-in-part of Ser. No. 777,889, Oct. 18, 1991, abandoned.

[51] Int. Cl.$^6$ .................................................. H05B 6/10
[52] U.S. Cl. .......................... 219/633; 219/634; 219/759; 156/272.4; 156/380.2
[58] Field of Search ..................... 219/634, 633, 219/618, 647, 649, 759, 656, 670; 156/272.4, 272.2, 379.8, 380.2, 380.5

[56] References Cited

U.S. PATENT DOCUMENTS

| | | |
|---|---|---|
| 2,241,312 | 5/1941 | Luty . |
| 2,273,423 | 2/1942 | Somes . |
| 2,372,920 | 4/1945 | Blessing . |
| 2,378,801 | 6/1945 | Sidell et al. . |
| 2,423,922 | 7/1947 | Arndt, Jr. . |
| 2,589,777 | 3/1952 | Collins . |
| 2,739,829 | 3/1956 | Pedlow et al. . |
| 2,761,941 | 9/1956 | Ardichvili . |
| 2,898,435 | 8/1959 | Crafts . |
| 3,061,503 | 10/1962 | Gould et al. ............... 156/272.4 |
| 3,101,403 | 8/1963 | Lewis et al. . |
| 3,183,460 | 5/1965 | Bennon . |
| 3,288,979 | 11/1966 | Mills et al. . |
| 3,395,261 | 7/1968 | Leatherman et al. . |
| 3,427,421 | 2/1969 | Matheson et al. ............ 219/634 |
| 3,431,379 | 4/1969 | Yrene . |
| 3,450,856 | 6/1969 | Buck et al. . |
| 3,492,453 | 1/1970 | Hurst . |
| 3,507,735 | 4/1970 | Chisholm . |
| 3,574,031 | 4/1971 | Heller, Jr. et al. . |
| 3,845,268 | 10/1974 | Sindt . |
| 3,864,186 | 2/1975 | Balla . |
| 3,941,643 | 3/1976 | Balla . |
| 3,946,349 | 3/1976 | Haldeman, III . |
| 3,996,402 | 12/1976 | Sindt . |
| 4,005,302 | 1/1977 | Graf et al. . |
| 4,029,837 | 6/1977 | Leatherman . |
| 4,029,926 | 6/1977 | Austin . |
| 4,091,254 | 5/1978 | Struve . |
| 4,120,712 | 10/1978 | Sindt . |
| 4,180,717 | 12/1979 | Lenk et al. . |
| 4,296,295 | 10/1981 | Kiuchi . |
| 4,304,975 | 12/1981 | Lenk et al. . |
| 4,313,777 | 2/1982 | Buckley et al. . |
| 4,343,982 | 8/1982 | Schwartz et al. . |
| 4,355,222 | 10/1982 | Geithman et al. . |
| 4,382,113 | 5/1983 | Schwartz et al. . |
| 4,416,713 | 11/1983 | Brooks . |
| 4,421,588 | 12/1983 | Davies . |
| 4,445,951 | 5/1984 | Lind et al. . |

(List continued on next page.)

FOREIGN PATENT DOCUMENTS

| | | |
|---|---|---|
| 0461979B1 | 4/1994 | European Pat. Off. . |
| 54-25542 | 2/1979 | Japan . |

OTHER PUBLICATIONS

J. Giachino, Welding Skills and Practices, Am. Tech. Soc., Chicago, IL (1960,1965,1967,1971,1976) 393–401.

Primary Examiner—Philip H. Leung
Attorney, Agent, or Firm—John C. Hammar

[57] ABSTRACT

Susceptors for induction heating for use in thermoplastic welding are tailored to provide precise control of the heat applied to the weld and especially to control overheating at the edges of susceptor. The preferred susceptor has a central portion having a uniform pattern of substantially similar openings and selvage edge strips devoid of openings to provide a low impedance current path for eddy currents at the edges. We can create aerospace structure, particularly a wingskin-spar assembly, without fasteners.

19 Claims, 2 Drawing Sheets

U.S. PATENT DOCUMENTS

| | | |
|---|---|---|
| 4,521,659 | 6/1985 | Buckley et al. . |
| 4,653,396 | 3/1987 | Wennerberg . |
| 4,673,450 | 6/1987 | Burke . |
| 4,768,433 | 9/1988 | Boissevain . |
| 4,822,972 | 4/1989 | Sugioka et al. . |
| 4,897,518 | 1/1990 | Mucha et al. . |
| 4,904,972 | 2/1990 | Mori et al. . |
| 4,919,759 | 4/1990 | Ilmarinen et at. . |
| 4,947,464 | 8/1990 | Mori et al. . |
| 4,978,825 | 12/1990 | Schmidt et al. . |
| 5,074,019 | 12/1991 | Link . |
| 5,079,817 | 1/1992 | Anstotz et al. . |
| 5,101,086 | 3/1992 | Dion et al. . |
| 5,199,791 | 4/1993 | Kasanami et al. . |
| 5,250,776 | 10/1993 | Pfaffmann . |
| 5,283,409 | 2/1994 | Brendel et al. . |
| 5,313,034 | 5/1994 | Grimm et al. . |
| 5,313,037 | 5/1994 | Hansen et al. . |

SELVAGED SUSCEPTOR FOR THERMOPLASTIC WELDING BY INDUCTION HEATING

REFERENCE TO RELATED APPLICATIONS

The present application is a continuation-in-part application based upon U.S. patent application 08/286,360, filed Aug. 5, 1994, which is a continuation-in-part application based upon U.S. patent application 08/068,520, filed May 27, 1993, now abandoned, which was a continuation-in-part application based upon U.S. patent application 07/777,889, filed Oct. 18, 1991, now abandoned. We incorporate these earlier patent applications by reference.

TECHNICAL FIELD

This invention relates in general to induction welding of multiple plies of thermoplastic materials to form a thermoplastic fusion bond and, in particular, to welding of thermoplastic and/or thermoset composite assemblies using a susceptor to focus heating in the bond area.

BACKGROUND ART

The exponential decay of the strength of magnetic fields dictates that, in induction welding processes, the structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some case, destruction or denaturing of the resin. To avoid overheating of the outer plies and to insure adequate heating of the inner plies, a susceptor of significantly higher conductivity than the fibers is used to peak the heating selectively at the bond line of the plies when heating from one side. An electromagnetic induction coil on one side of the assembly heats a susceptor to melt and cure a thermoplastic resin (also sometimes referred to as an adhesive) to bond the elements of the assembly together. Often the current density in the susceptor is higher at the edges of the susceptor than in the center because of the nonlinearity of the coil. This problem typically occurs when using a cup core induction coil like that described in U.S. Pat. No. 5,313,037 and can result in overheating the edges of the assembly or underheating the center, either condition leading to inferior welds because of non-uniform curing. It is necessary to have an open or mesh pattern in the susceptor to allow the resin to bond between the composite elements of the assembly when the resin heats and melts.

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding requires complicated surface pretreatments.

In contrast, thermoplastic welding, which eliminates fasteners, features the ability to join thermoplastic composite components at high speeds with minimum touch labor and little, if any, pretreatments. In our experience, the welding interlayer, called a susceptor, also can simultaneously take the place of shims required in mechanical fastening. As such, composite welding holds promise to be an affordable joining process. For "welding" thermoplastic and thermoset composite parts together, the resin that the susceptor melts functions as a hot melt adhesive. If fully realized, the thermoplastic-thermoset bonding will further reduce the cost of composite assembly.

There is a large stake in developing a successful induction welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue permits rapid field repair of composites or other structures.

There is little or no loss of bond strength after prolonged exposure to environmental influences.

U.S. Pat. No. 4,673,450 describes a method to spot weld graphite fiber reinforced PEEK composites using a pair of electrodes. After roughening the surfaces of the prefabricated PEEK composites in the region of the bond, Burke placed a PEEK adhesive ply along the bond line, applied a pressure of about 50–100 psi through the electrodes, and heated the embedded graphite fibers by applying a voltage in the range of 20–40 volts at 30–40 amps for approximately 5–10 seconds with the electrodes. Access to both sides of the assembly is required in this process which limits its application.

Prior art disclosing thermoplastic welding with induction heating is illustrated by U.S. Pat. Nos. 3,996,402 and 4,120,712. In these patents, the metallic susceptors used are of a conventional type having a regular pattern of openings of traditional manufacture. Achieving a uniform, controllable temperature in the bondline, which is crucial to preparing a thermoplastic weld of adequate integrity to permit use of welding in aerospace primary structure, is difficult with those conventional susceptors, as we discussed and illustrated in our copending U.S. patent application Ser. No. 08/068,520.

Thermoplastic welding is a process for forming a fusion bond between two faying thermoplastic faces of two parts. A fusion bond is created when the thermoplastic on the surface of the two parts is heated to the melting or softening point and the two surfaces are brought into contact, so that the molten thermoplastic mixes, and the surfaces are held in contact while the thermoplastic cools below the softening temperature.

Simple as the thermoplastic welding process sounds, and easy as it is to perform in the laboratory on small pieces, it becomes difficult to perform reliably and repeatably in a real factory on full-scale parts to build a large structure such as an airplane wingbox. The difficulty is in getting the proper amount of heat to the bondline without overheating the entire structure, and also in achieving intimate contact of the faying surfaces of the two parts at the bondline during heating and cooling despite the normal imperfections in the flatness of composite parts, thermal expansion of the thermoplastic during heating to the softening or melting temperature, flow of the thermoplastic out of the bondline under pressure, and then contraction of the thermoplastic in the bondline during cooling.

One technique for getting heat to the bondline in a thermoplastic assembly to be welded together is to include a conductive layer or article, known as a "susceptor", between the two surfaces to be welded, and to heat the susceptor by resistive heating so that the susceptor functions as a bondline heat source to melt or soften the thermoplastic at the bondline for fusion of the faying surfaces of the composite components to be joined. The electric current for heating the susceptor can be in the form of eddy currents generated inductively, as taught for example by U.S. Pat. Nos. 3,395,261 and 4,978,825, or it can be conducted directly to the susceptor through tabs or the like as shown in U.S. Pat. No. 5,313,034.

In U.S. patent application Ser. Nos. 08/286,360 and 08/068,520, we described a tailored susceptor for approaching the desired temperature uniformity. This susceptor relied upon carefully controlling the geometry of openings in the susceptor (both their orientation and their spacing) to distribute the heat evenly. For example, we suggested using a regular array of anisotropic, diamond shaped openings with a ratio of the length (L) to the width (W) greater than 1 to provide a superior weld over that achieved using a susceptor having a similar array, but one where the L/W ratio was one. By changing the length to width ratio (the aspect ratio) of the diamond-shaped openings in the susceptor, we achieved a large difference in the longitudinal and transverse conductivity in the susceptor, and, thereby, tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, we altered the current density in regions near the edges by increasing the foil density (i.e., the absolute amount of metal). Increasing the foil density along the edge of the susceptor increases the conductivity along the edge and reduces the current density and the edge heating. We increased foil density by folding the susceptor to form edge strips of double thickness or by compressing openings near the edge of an otherwise uniform susceptor. We found these susceptors difficult to reproduce reliably. Also, their use forced careful placement and alignment to achieve the desired effect.

The tailored susceptor for our earlier application was designed to use with the cup core of U.S. Pat. No. 5,313,037. With this coil, the magnetic field is strongest near the edges because the central pole creates a null at the center. Therefore, the susceptor is designed to counter the higher field at the edges by accommodating the induced current near the edges. The high longitudinal conductivity encourages induced currents to flow longitudinally.

SUMMARY OF THE INVENTION

Our selvaged susceptor for thermoplastic welding controls the current density pattern during eddy current heating by an induction coil to provide substantially uniform heating to a composite assembly and to insure the strength and integrity of the weld in the completed part. This susceptor is particularly desirable for welding ribs between prior welded spars using an asymmetric induction coil, because, with that coil, it provides a controllable area of intense, uniform heating, a trailing region with essentially no heating, and a leading region with minor preheating.

The power (P) or power density which the susceptor dissipates as heat follows the well-known equation for power loss in a resistor: $P = (J^2)(R)$ wherein J is the eddy current (or its density) and R is the impedance (i.e., resistance) of any segment of the eddy path. The heating achieved directly corresponds to the power (or power density).

We achieve better performance (i.e., more uniform heating) in rib welding by using a selvaged susceptor having edge strips without openings. The resulting susceptor, then, has a center portion with a regular pattern of openings and solid foil edges, which we refer to as selvage edge strips. We embed the susceptor in a thermoplastic resin to make a susceptor/resin tape that is easy to handle and to use in preforming the composite pieces prior to welding. Also, we have discovered that, with a selvaged susceptor, the impedance of the central portion should be anisotropic with a lower transverse impedance than the longitudinal impedance. Here, the L/W ratio of diamond shaped openings should be less than or equal to one. That is, unlike our tailored susceptor of U.S. patent application Ser. No. 08/286,360, L for the selvaged susceptor should be less than W. With this new selvaged susceptor in the region immediately under the asymmetric induction work coil, we encourage the current to flow across the susceptor to the edges where the current density is lowest and the conductivity, highest.

Generally, we form the selvaged susceptor somewhat wider than normal so that the selvage edge strips are not in the bond line. We remove the selvage edge strips after forming the weld, leaving only a perforated susceptor foil in the weld. This foil has a relatively high open area fraction.

DETAILED DESCRIPTION

Figure 1:
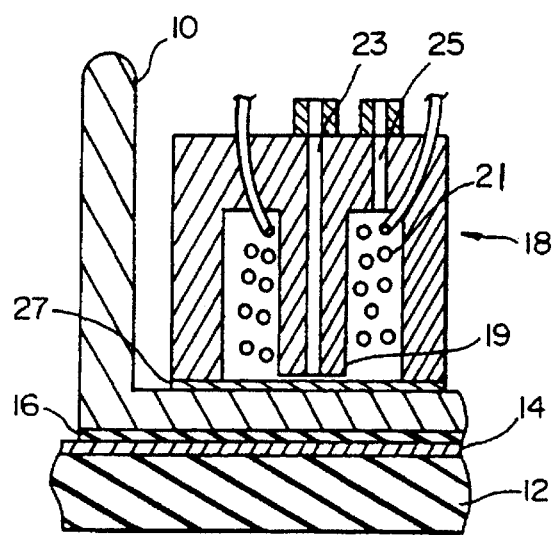
FIG. 1 is a cross sectional schematic of a typical thermoplastic welding process.

In FIG. 1, to form a thermoplastic weld, a susceptor 14 embedded in a thermoplastic resin 16 is inserted between composite parts 10 and 12. A moving induction coil 14 induces eddy currents in the susceptor 19 which results in heating the assembly uniformly to melt and to cure the resin. The preferred induction coil is a "C" coil design that activates windings around one pole of the "C" to produce an asymmetric field of high strength in a controlled area. (FIG. 5) In this way, we achieve uniform temperatures across the susceptor in the "oven region" between the poles of the coil as the coil moves (in the case shown in FIG. 5, from right to left). The asymmetric coil creates a relatively weak field ahead of the coil to preheat the bondline. The field trailing the coil is essentially nonexistant, so the coil does not induce a current and no further heating occurs behind the coil. The present invention uses a selvaged susceptor that includes solid metal selvage strips along the edges. By moving the asymmetric coil along the seam at a predetermined rate, we can maintain a uniform heating pattern and form a high quality weld. The asymmetric coil has the pole windings in opposite helical senses so that, with one winding activated, the coil is designed to move in one direction with the desired heating pattern, while, with the other coil activated, the coil is designed to travel in the other direction. Thus, we can controllably weld the ribs to either end because we can start and move in either direction based upon the selection of the activated coil. The asymmetric induction work coil is more completely described in U.S. Pat. No. 5,444,220.

The susceptor 14 is fabricated from a copper foil having a thickness of from 0.003–0.010 in (0.075–0.25 mm). Any material having good electrical conductivity may be used. Our susceptor has a pattern of openings (usually diamonds) made by conventional methods such as etching, stamping, or expansion. The susceptor can also be nickel, copper-coated nickel, or another suitable metal. We use diamond shapes with uniform line widths of about 7 mils (0.18 mm) to define the peripheries of the diamonds. The diamonds can have L/W ratios less than or equal to 1.0. Other shapes can be used to create a susceptor that has a uniform impedance in the longitudinal and transverse directions or, for welding with the asymmetric coil, one where the traverse impedance is lower than the longitudinal impedance.

Figure 2:
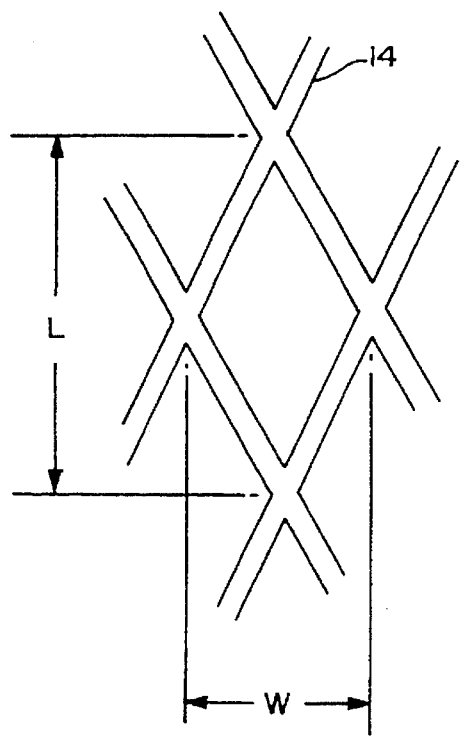
FIG. 2 is a detail of openings in a susceptor.

The ratio of length to width (L/W) (FIG. 2) for the selvaged susceptor affects the susceptor's heating and the quality of the weld. Having higher longitudinal impedance influences the induced current to flow transversely in the path of least resistance toward the selvaged edges. Once in the edges, the conductivity is the highest and the current density the lowest, so the eddies can turn easily.

Figure 3:
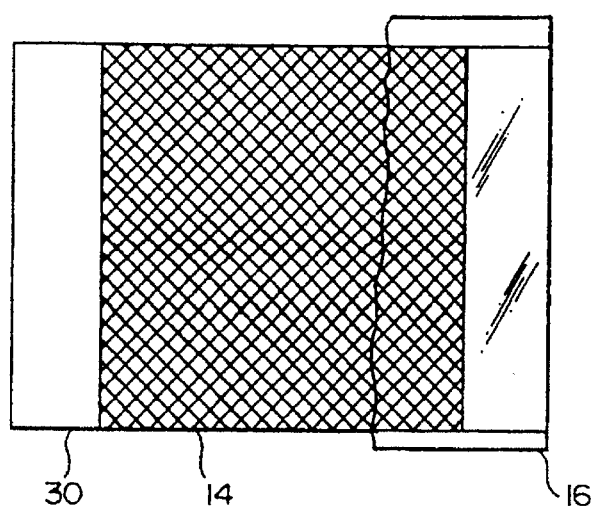
FIG. 3 is a plan view of a preferred susceptor of the present invention.
Figure 4:
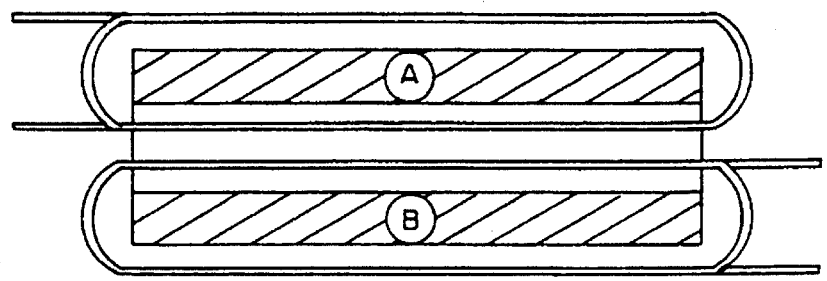
FIG. 4 is a schematic plan view of an asymmetric work coil generally used with our selvaged susceptor.

We modify the edges of the selvaged susceptor as shown in FIG. 3 to adjust the current density. We seek to accommodate a higher current density at the edges so that the edges will produce a proportionately lower eddy current for a constant field strength. In this way, the coil will heat the edges uniformly with the center. The selvaged susceptor counters the nonlinearities that naturally occur with cup core coils. It provides an area outside the bondline when using the asymmetric coil so that the eddy currents can turn and proceed transversely back across the open mesh of the selvaged susceptor.

Figure 5:
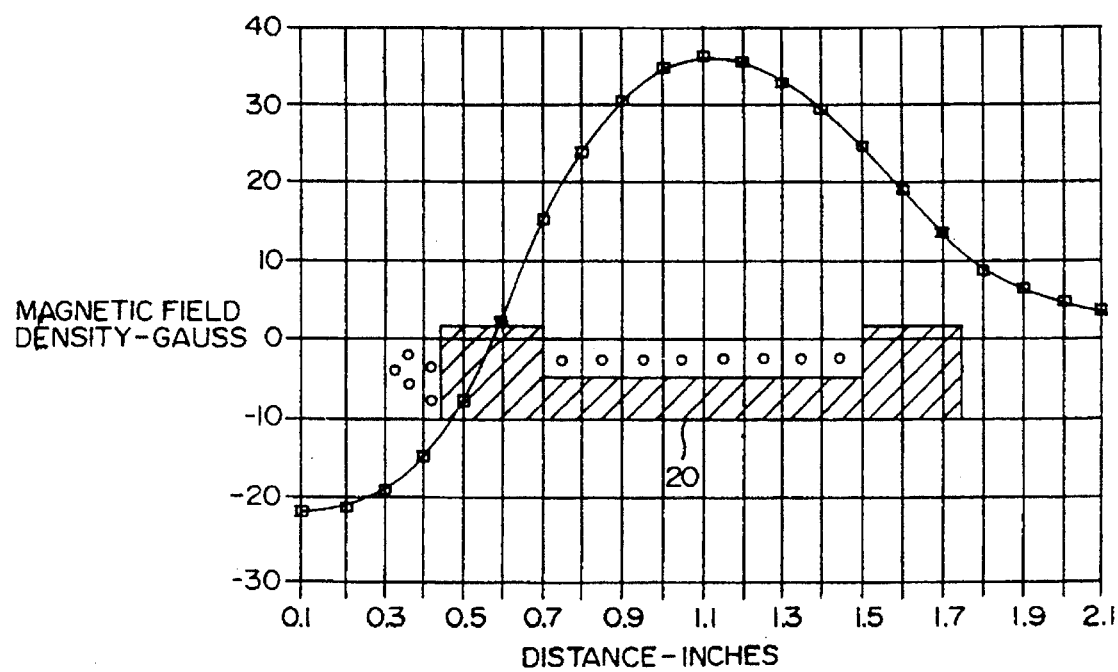
FIG. 5 is a graph plotting the magnetic field distribution achieved with the asymmetric work coil.

FIG. 3 shows our preferred susceptor design. The edges have solid copper selvage strips 30, devoid of openings, to maximize the current density in the edge region while the center has the characteristic diamond pattern of openings. Neither folding nor compressing in the edge region produces a high enough current density to produce the uniform heating we need with our cup core coil to produce reliable, reproducible, quality thermoplastics welds. Using solid selvage edge strips is better, especially at the beginning and end of a weld run where the dwell of the coil can introduce thermal discontinuities that we avoid when we are moving the coil slowly along the weld seam. Using an asymmetric coil which has an "A" winding on one pole of the "C" core and a "B" winding of opposite helical twist on the other pole, we can achieve relatively uniform, intense heating between the poles with relatively insignificant heating outside the poles, at least in the region trailing the moving coil. Only one coil winding is active at a time. The typical magnetic field distribution for this asymmetric coil is shown in FIG. 5. This coil allows us to heat uniformly under the coil to the edges of susceptor on the ribs without remelting or overheating the welded area under the abutting spar. The asymmetry provided by two windings, only one being active at a time, allows us to travel in either direction with start-up or finish without significant heating under the spar. Thermal discontinuities produce welds of differing characteristics which can, from the uncertainty of quality, cause designers to question the integrity of the structure. Using solid edge selvage strips as shown in FIG. 3, we have minimized thermal discontinuities (especially at the start or finish of the weld) and produce better welds more consistently. The edge strips are in the order of 1.0–15.0 mm, and usually are outside the bondline. That is, the open center portion is essentially the same width as the cap of the spar or rib. Welding does not occur under the edge strips and the strips can be removed after welding is finished.

Our goal is to produce aircraft structure that eliminates fasteners. Welded structure will be far less expensive because welding eliminates the labor to drill holes accurately and to inspect the fasteners after installation. We also will avoid other problems that fasteners introduce, such as sealing around the fastener and the holes, mismatch of materials, and arcing from the fasteners. To replace the fasteners, however, requires confidence that the welds are uniform and consistent, because a failure at any weak point in the weld could lead to catastrophic unzipping of the entire welded structure. The present invention, then, focuses upon one of the most important problems, temperature uniformity along the bond line to achieve uniform and complete melt and cure of the resin. A typical application would be welding a wingskin to the underlying spars and ribs.

As mentioned earlier, we embed the susceptor in the resin to simplify the welding process. Making a susceptor/resin tape eliminates the steps of applying separate layers of resin between the respective elements in a composite-susceptor-composite assembly. It also ensures that there will always be adequate resin proximate the susceptor and essentially uniform resin thickness across the welding bond line. Our typical tape is about 2 inches wide with KIII Avimid resin (an aromatic polyimide), although we can use PEEK, PEKK, PES, or any other thermoplastic. The resin must be compatible with the matrix resin in the composite and generally is the same resin as the matrix resin when welding thermoplastic composites. For welding thermoset composites, the resin will likely be a comparable thermoplastic formulation of the matrix resin in the composites or a compatible resin.

The composites we join with thermoplastic welding are typically the same materials and are prefabricated before the welding. Typically, the composite is a carbon or graphite fiber reinforced KIII that has a melt temperature of 310° C. (620° F.). It is resin rich in the region of the bond line because we add sacrificial plies in the areas of the bond line. We complimentary profile the surfaces of the composite parts to ensure a weld free from voids. We assemble the composite parts with the resin/susceptor tape lying along the bond line, and complete the welding by moving the induction coil from one end to the other at about 2–4 inches (5–10 cm) per minute. We can use multiple passes to improve the weld, according to the method of Walker and Peterson described in our copending U.S. patent application Ser. No. 08/367,546. An initial pass to heat the bond line to about 100 deg C., we believe, helps to dry the bond and improves the resulting weld.

The improvement in bond strength with multiple welding passes was discovered fortuitously and was investigated in detail after Walker and Peterson identified it. While we do not yet fully understand the mechanism at work that provides the improved bond strength, we believe it includes the following factors: reduction in bondline thickness, improved ratio of bonded vs. unbonded surface area in the bondline (or expressed conversely, a reduction of the amount of unbonded surface area in the bondline), improved pass-through of bonding resin through the interstices of the susceptor, and improved bonding of the thermoplastic to the susceptor itself. These factors are our best current understanding of the observed phenomenon.

Irregularities such as hollows, depressions, or asperites (peaks) in the faying surfaces of the parts, and other deviations from perfect flatness can interfere with and prevent continuous intimate contact along the full surfaces of the parts where bonding is intended. These deviations from perfect flatness include small scale surface features such as asperites, depressions or hollows, scratches and bumps, and also large scale features such as waviness in the direction of the major length dimension, twist about the longitudinal axis, dishing or saging of "I" beam flanges, and warping such as humping or bowing in the longitudinal direction.

When the two parts with these surface irregularities in their faying surfaces, are brought together with a susceptor between them, the first pass of the welding head heats the susceptor to about the melting temperature of the thermoplastic faying surfaces of the parts. All of the resin encapsulating the susceptor melts and all of the resin in contact with the susceptor/resin pack also melts, and the pressure exerted on the wing skin in the vicinity of the work coil presses the faying surfaces closer together and extrudes excess resin from the tops of the projecting surface irregularities. However, surface irregularities upstream and downstream of the zone being heated by the coil remain uneven and continue to interfere with perfect intimate contact by the full surface areas of the faying surface. Some of the surface irregularities in the heated zone are melted and flattened in this first pass and the parts are now welded together with some percentage of the bondline faying surfaces fusion bonded together. Some small scale irregularities may remain, preventing full intimate contact of the surfaces, and most of the large scale irregularities may still remain, also preventing some contact.

During the second pass of the welding head, the resin in contact with the susceptor is again heated to the melting or softening temperature by the heated susceptor, and the pressure exerted by the pressure pads on the welding head presses the faying surfaces into more intimate contact, extruding additional thermoplastic from the bondline. The projections above the plane of perfect flatness on the two parts are reduced further, and the hollows are partially filled in by melted or softened resin melted off the high points of the surface irregularities.

The selvaged susceptor of this invention permits control of the heating of thermoplastic welding process by tailoring the susceptor shape and edge density according to the needs of the particular assembly to be welded. It is particularly useful for welding ribs between prior welded spars where it is important to complete the weld all the way to the end and edges of the susceptors.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and are not intended to limit it. Accordingly, limit the claims only as necessary in view of the pertinent prior art.

We claim:

1. A susceptor for use in thermoplastic welding comprising a metal susceptible to induction, having a substantially uniform pattern of uniformly sized, diamond-shaped openings extending through the metal, said openings being separated by straight lines of the metal having a line width of about 0.18 mm and having a length (L) and a width (W), the length and the width of said openings being a predetermined aspect ratio (L/W), and selvaged edges devoid of openings laterally attached to the patterned portion so that the susceptor heats substantially uniformly when subjected to the oscillating magnetic field produced with a coil inductor.

2. The susceptor of claim 1 wherein the width of the selvaged edges is about 1–15 min.

3. The susceptor of claim 1 wherein the aspect ratio (L/W) is less than or equal to 1.0.

4. The susceptor of claim 1 further comprising a thermoplastic resin surrounding the material and filling the openings.

5. The susceptor of claim 4 wherein the resin is an aromatic polyimide.

6. The susceptor of claim 4 wherein the susceptor is a thin metal foil selected from the group consisting of copper, nickel, and copper-coated nickel having a thickness of about 0.7075–0.25 mm and wherein the thermoplastic resin is selected from the group consisting of polyimide, PEEK, PEKK, and PES.

7. The susceptor of claim 1 wherein $L \leq W$ so that the transverse impedance is less than or equal to the longitudinal impedance.

8. A method for achieving temperature uniformity along the bond line of a thermoplastic weld wherein heating is accomplished by inducing eddy currents in a susceptor with a moving coil, comprising the step of:

selvaging the susceptor to provide edge regions having relatively higher current densities and higher conductivity than a central portion of the susceptor, wherein each edge region is a solid lateral strip of a solid portion of the susceptor devoid of openings and about 1–15 mm in width.

9. The method of claim 8 wherein the susceptor includes a central, patterned portion having a plurality of substantially similar, uniform, diamond-shaped openings.

10. The method of claim 9 wherein the openings have a length (L) and a width (W) such that the transverse and longitudinal impedances of the central portion are controllable by altering the aspect ratio (L/W) of the openings.

11. The method of claim 10 wherein the openings are separated by straight line segments having a line width of about 0.18 mm.

12. A welded composite assembly comprising:

(a) first and second composite members arranged to define a bond line;

(b) a resin along the bond line to join the composite members; and (c) a selvaged susceptor partially embedded within the bond line, the susceptor having lateral edge portions outside the bond line providing higher current densities in the edges for induction heating relative to a central portion of the susceptor connected between the edges, wherein the central portion is embedded within the bond line and includes a pattern of openings such that the transverse and longitudinal impedances of the central portion are controllable by adjusting the relative dimensions of the openings.

13. The assembly of claim 12 wherein the resin is an aromatic polyimide.

14. The assembly of claim 12 wherein the central portion of the susceptor has a uniform pattern of substantially similar openings extending through the susceptor.

15. The assembly of claim 14 wherein the lateral edge portions are devoid of openings.

16. The assembly of claim 12 wherein the first composite member is a wingskin and the second composite member is a wing spar or rib.

17. A method for thermoplastic welding by induction heating, comprising the steps of:

(a) positioning a selvaged susceptor including at least a central portion encased with a resin between two thermoplastic composite parts to define a bond line, wherein selvage edge strips on the susceptor are outside the bond line and provide substantially uniform heating across the bond line in the susceptor when currents are induced in the susceptor;

(b) inducing a current in the susceptor with an induction coil to melt the resin; and (c) resolidifying the resin by stopping the induction of a current in the susceptor to form the thermoplastic weld in the bond line.

18. The method of claim 17 further comprising the step of trimming the selvaged edge strips from the susceptor.

19. The product of the process of claim 17.

* * * * *

UNITED STATES PATENT AND TRADEMARK OFFICE
CERTIFICATE OF CORRECTION

PATENT NO. : 5,508,496

DATED : April 16, 1996

INVENTOR(S) : Hansen, et al.

It is certified that error appears in the above—identified patent and that said Letters Patent is hereby corrected as shown below:

Column 8, line 20:
  In claim 6, line 4, "0.7075" should read - - 0.075 - -

Signed and Sealed this

Twentieth Day of August, 1996

*Attest:*

BRUCE LEHMAN

*Attesting Officer*   Commissioner of Patents and Trademarks